United States Patent Office 2,890,720
Patented June 16, 1959

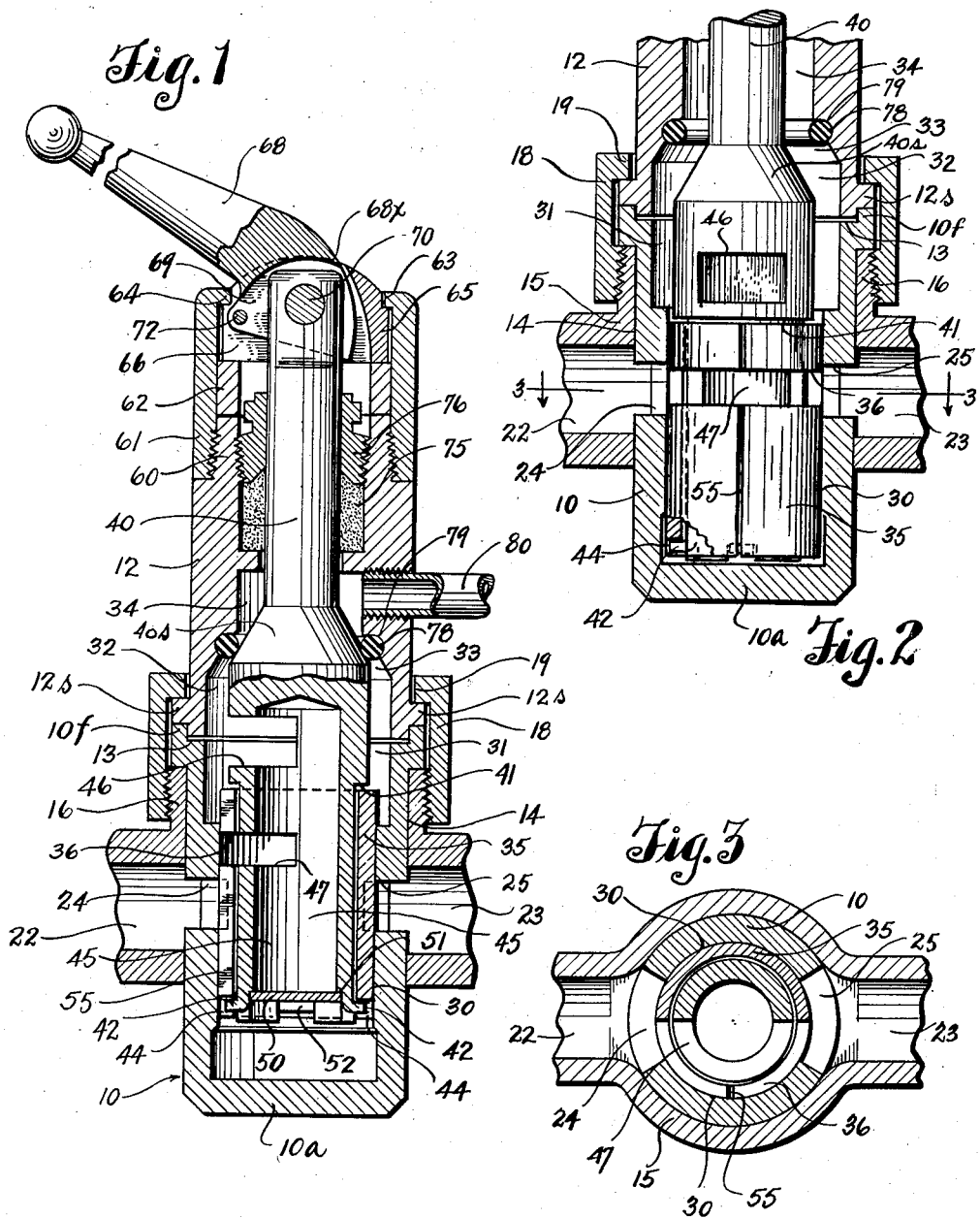

2,890,720

VALVE STRUCTURE WITH TWO PART HOUSING

Alfred M. Moen, Elyria, Ohio

Application October 1, 1956, Serial No. 613,033

3 Claims. (Cl. 137—636.2)

This invention relates to faucets and the like and more particularly to a novel form of housing and novel valve structure especially adapted for use in mixing faucets wherein the flow of hot water or of cold water, or a mixture of hot water and cold water is controlled by a single valve mechanism.

One of the principal objects of the present invention is to provide a novel and simplified housing whereby the assembly of parts comprised by the faucet is greatly facilitated and whereby dis-assembly for inspection or replacement of parts is made easy.

Another of the principal objects of the invention is to provide a novel and satisfactory valve structure which automatically compensates for any mis-alignment of the valve cylinder, valve or stem mounting means.

A further object is to provide a valve housing that is made up of two tubular sections, joined end to end by a union-type connector ring or fitting which, in the present instance, serves also to removably fix the valve housing for use in a special water supply line fitting.

Another object of the invention is to provide a valve structure that is characterized by a tubular, movable valve member applied within a valve cylinder; the tubular valve member being longitudinally split and applied within the cylinder under compression to cause it to automatically maintain a sliding fit of desired closeness with the cylinder wall regardless of wear.

Still further objects of the invention reside in the details of construction and combination of parts embodied by the valve structure and in their mode of use, as will hereinafter be described.

In accomplishing the above mentioned and other objects of the invention, I have provided the improved details of construction, the preferred forms of which are illustrated in the accompanying drawings, wherein:

Fig. 1 is a cross-sectional view of a valve structure embodied by the present invention; the section being taken in the axial plane of the valve housing and showing the valve in its closed position.

Fig. 2 is a similar sectional view of the valve housing, showing the valve in an open position and adjusted to receive both hot and cold water.

Fig. 3 is a horizontal section taken on line 3—3 in Fig. 2.

Referring more in detail to the drawings:

The valve housing is shown to be of cylindrical or tubular form, and to comprise lower and upper end sections, 10 and 12, joined in a water-tight joint end to end. The lower section 10 is closed at its lower end by wall 10a and is formed about its upper end with an outset and upwardly projecting flange 10f within which is an annular counter-sunk seat 13. The lower end of the upper section 12 of the housing extends downwardly within the annular flange 10f of the lower section. It is formed about its lower end portion with an outwardly projecting annular shoulder 12s which rests in a tight joint against the top edge of flange 10f. Thus the two sections 10 and 12 are positioned in axial alignment and the housing as thus formed by the assembled sections is applied downwardly through a vertical bore 14 in a fitting 15. This fitting is formed with an upwardly directed neck portion 16 which seats the lower face of the flange 10f in a tight joint thereagainst. These two parts, 10 and 12, which constitute the valve housing, are held clamped tightly together by a union type coupling ring 18 that is applied about the flanged ends of the two sections and which has an inturned flange 19 about its upper end that seats against the top side of the annular shoulder 12s, and along its lower portion is threaded onto the neck 16 of fitting 15 and drawn tight, thus securing the housing in the fitting 15.

The fitting 15 is formed with water supply passages 22 and 23 for hot and cold water, respectively. These passages communicate respectively with passages 24 and 25 formed in opposite sidewalls of the lower housing section 10. Each of these latter passages extends circumferentially of the housing through an arc of about 80° as noted in Fig. 3.

The housing section 10 is formed with a coaxial, cylindrical chamber 30 that extends upwardly from the lower end wall 10a to a level that is above the level of the housing inlets 24 and 25 and then continues at an increased diameter providing a mixing chamber 31. The upper section 12 of the housing has an axial bore directed upwardly thereinto from its lower end, providing, at the start, a chamber 32 equal in diameter to chamber 31 and serving as an upward continuation thereof. The chamber 32 terminates at its upper end in a conically tapered passage 33 that leads into a coaxial cylindrical chamber 34.

Slidably and rotatably fitted in the cylindrical chamber 30 is a valve sleeve 35. This is formed in its upper end portion with a circumferentially directed inlet passage 36 which extends through an arc of 180° as noted in Fig. 3. The valve sleeve is adapted to be adjusted to different positions to control water flow and mixture by means of a valve stem 40 which extends coaxially through the housing section 12, and downwardly through chambers 34, 32 and 31 and through the valve sleeve 35. The upper part of the stem is of lesser diameter than the chamber 34, but is of increased diameter within the mixing chambers 31—32 and at its plane of entry into the valve sleeve is slightly reduced in diameter to provide it with an annular, downwardly facing shoulder 41 which engages against the top edge of the valve sleeve 35. This lower portion of the stem extends with slight clearance through the valve sleeve and at its lower end has ears 42 out-turned therefrom and contained within notches 44 in the lower end of the sleeve. Thus, the sleeve is held on the stem against any relative longitudinal or rotative movement.

The lower end portion of the stem is formed with a coaxial bore or chamber 45 leading upwardly thereinto to well within the level of the mixing chamber 32, and is there formed with a lateral opening 46 opening with a circumferentially directed inlet passage 47 registering with the sleeve passage 36 to its full length. Thus, by an up and down adjustment of the valve stem, the valve sleeve can be adjusted accordingly to register the inlet passages 36 and 47 with one or both of the inlet passages 24 and 25, and then by a rotative adjustment can change the water mixture through a range from all hot to all cold.

At its lower end the stem chamber 45 is closed by a disk 50 fitted therein and secured against a downwardly facing shoulder 51 by ears 52 turned inwardly from the lower end of the stem against the underside of the disk.

A feature of this particular valve sleeve resides in the fact that it is longitudinally split, as at 55 and is applied within the cylinder 30 under compression so that it automatically adjusts itself to maintain a desired closeness of fit and prevent looseness that may be incident to wear. It is further to be noted that the longitudinal split 55 is at the inlet passage 36 side of the sleeve and will not allow passing of water from openings 24 to 25, or vice versa, in any open or closed position of the valve.

A means for control and adjustment of the valve will now be described. Threaded onto a reduced neck portion 60 at the upper end of the housing section 12 is a bonnet 61 and fitted within this is a cylindrical collar 62 that rests against the upper end surface of the neck 60. Formed in the upper end of the bonnet is an opening 63 defined by an inturned bonnet flange 64. Fitted for free turning in the bonnet between the collar 62 and inturned flange 64 is a bearing 65 with a dome shaped top portion extended upwardly through opening 63. This bearing is formed with a diametrically directed slot 66 that opens through the top and to one side thereof and which slot contains therein the inner downturned end portion of a valve adjusting handle 68; this being referred to as the head portion 68x, and it is vertically flattened for easy fitting in the slot. This downturned part of the handle is also formed, in the longitudinal direction of the handle, with a slot or channel 69 in which the flattened upper end portion of the valve stem 40 is received, and pivotally fixed by a horizontal pin 70 extended through the end of the stem and handle head. That side of the handle head 68x which is nearest the outer end of the handle, is fixed by a horizontal pivot pin 72 to the bearing 65; the pin 72 being parallel to the pin 70. Thus, by reason of these pivotal connections, any up and down movement of the outer end of the handle, causes the valve sleeve to be adjusted vertically between open and closed positions accordingly. Also, by a rotary movement of the handle 68 about the axial line of the valve stem, the stem and valve sleeve will be rotated accordingly. Thus, through the mediacy of the handle 68, valve adjustments for controlling water flow and mixture can be made manually.

The stem 40 extends slidably and rotatably through a packed gland 75 and packing nut 76 applied to the housing 12. Mixing within the chambers 31—32, the stem 40 has an upwardly facing conically tapered shoulder 40s that is adapted to close against an O-ring sealing gasket 78 fitted in a seat 79 at the entrance to the chamber 34.

An outlet pipe 80 is threaded through the wall of housing 12 into chamber 34.

The valve housing as thus described provides a structure that is easily machined; provides for easy assembly and the securing of parts in a leak tight assembly and results in an attractive, easily serviced, and efficiently operating structure.

What I claim as new is:

1. A valve structure comprising in combination, a water supply fitting formed with a passage therethrough and with hot and cold water inlets opening into said passage at opposite sides thereof, an exteriorly threaded neck portion surrounding one end of the passage, a valve housing applied through and fitted in said passage in a water tight joint; said housing enclosing a valve chamber in one end thereof, water inlets at opposite sides of said valve housing in direct communication with the inlets of said water supply fitting, an annular shoulder formed exteriorly on the valve housing of the upper end thereof and seated against the upper end of said neck portion of said water supply fitting, a discharge housing seated on and extending above said valve housing, an exterior annular shoulder on the lower end of said discharge housing, a union type clamping collar applied about said annular shoulders and threaded onto said neck portion of said water supply fitting to detachably secure the valve housing and discharge housing to the fitting, movable valve means contained in said valve chamber for controlling water inflow, and a stem operatively connected with said valve means, and extended through the discharge housing for actuation of said valve means.

2. A valve structure as in claim 1 wherein a mixing chamber is provided within the valve housing and discharge housing adjacent the juncture thereof.

3. A valve structure as in claim 1 wherein a portion of the discharge housing extends below the annular shoulder thereon and projects into said valve housing.

References Cited in the file of this patent
UNITED STATES PATENTS

| | | |
|---|---|---|
| 62,721 | Zundorff | Mar. 5, 1867 |
| 841,817 | Ricketts | Jan. 22, 1907 |
| 2,609,206 | Moen | Sept. 2, 1952 |
| 2,665,711 | Parks | Jan. 12, 1954 |
| 2,757,687 | Moen | Aug. 7, 1956 |
| 2,818,878 | Russell | Jan. 7, 1958 |